July 12, 1960 G. GOLDSTEIN 2,944,661
CONTACT LENS CONTAINER
Filed Nov. 18, 1958
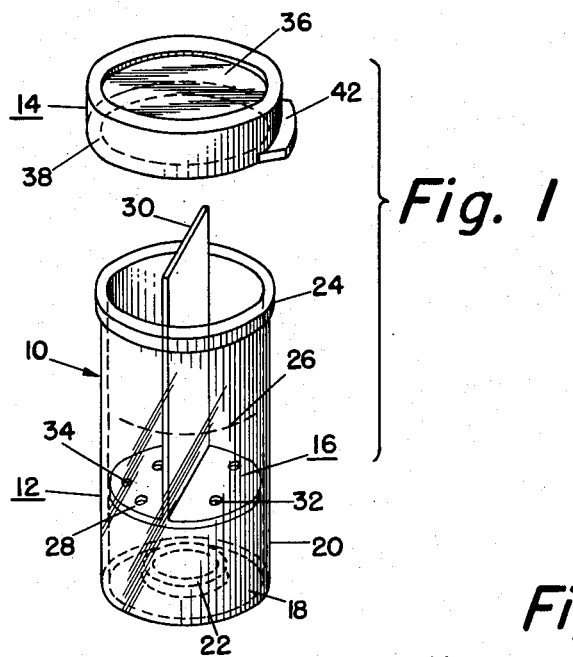
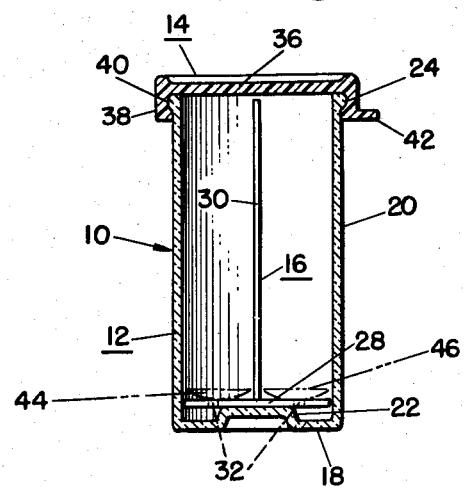
INVENTOR.
GILBERT GOLDSTEIN
BY Arthur H. Seidel
ATTORNEY.

United States Patent Office 2,944,661
Patented July 12, 1960

2,944,661
CONTACT LENS CONTAINER
Gilbert Goldstein, 7801 Roosevelt Blvd., Philadelphia, Pa.
Filed Nov. 18, 1958, Ser. No. 774,462
7 Claims. (Cl. 206—5)

The present invention relates to a contact lens container, and more particularly to a contact lens container which provides for proper storage and cleaning of contact lenses.

Contact lenses, when not in use, must be maintained wet. For this purpose, it has been the practice to place the contact lenses, when not in use, in a glass, jar, or saucer of water. However, such containers are subject to being easily spilled which may cause the contact lenses to be lost or damaged, such as by breaking the lenses or by scratching them. Furthermore, when the user desires to remove the lenses from the container, he must dip his fingers into the water and search around for the lenses. This is a messy and awkward process when the container is a household glass, jar, or saucer.

Each lens of a pair of contact lenses is particularly shaped for a particular eye. To help distinguish the lenses, one of the lenses is usually provided with a small colored mark of indicia. However, when the user removes a lens from the liquid, he still must carefully scrutinize the lens to be sure whether it is the right or left lens.

For proper care of the contact lenses, the lenses must be cleaned regularly. Heretofore, the cleaning of the lenses was done either by hand or by the use of clumsy utensils. Because of the small size and fragile nature of contact lenses, great care must be taken when cleaning them by hand to prevent them from being broken, scratched, or dropped and lost.

It is an object of the present invention to provide a small-compact container for safely storing contact lenses in a liquid.

It is another object of the present invention to provide a container for storing contact lenses in a liquid which provides for the removal of the lenses from the liquid quickly, easily, and without wetting the fingers.

It is still another object of the present invention to provide a container for contact lenses which separates the lenses and clearly indicates which lens is the right lens and which is the left lens.

It is a further object of the present invention to provide a container for contact lenses in which the lenses can be easily and safely cleaned.

Other objects will appear hereinafter.

For the purpose of illustrating the invention there is shown in the drawings a form which is presently preferred; it being understood, however, that this invention is not limited to the precise arrangements and instrumentalities shown.

Figure 1 is an exploded perspective view of the container of the present invention.

Figure 2 is a longitudinal sectional view of the container of the present invention.

Referring to the drawing, the contact lens container of the present invention, generally designated as 10, comprises a receptacle 12, a cover 14, and an agitator-lens holder 16.

Receptacle 12 is made of a transparent plastic material, and comprises a bottom 18 and an upstanding wall 20. Bottom 18 of receptacle 12 has a central raised portion 22, the purpose of which will be explained later. Wall 20 has an annular lip 24 projecting from its outer surface at the uppermost edge of the wall 20. A broken line 26 is printed on wall 20 to indicate how far the receptacle 12 should be filled with water. Although receptacle 12 is shown to be circular in transverse cross-section, it may also be square, hexagonal, or any other desired shape.

Agitator-lens holder 16 is made of an opaque plastic material and comprises a relatively flat lens holder plate 28 and an agitator arm 30 integral with or secured to plate 28 and extending upwardly from plate 28. Agitator arm 30 extends diametrically across lens holder plate 28 and is of a width substantially equal to the diameter of plate 28, and of a height slightly shorter than the height of receptacle 12. Lens holder plate 28 is of the same shape and size as the inside of receptacle 12 and has a plurality of holes 32 therethrough, at least one hole 32 being on each side of the agitator arm 30. A colored indicia mark 34 is printed on the upper surface of lens holder plate 28 on one side of agitator arm 30.

Cover 14 is also made of plastic and comprises a top 36 having a downwardly extending annular rim 38 around its periphery. Rim 38 has an annular groove 40 in its inner surface of a size to receive the lip 24 on the wall 20 of receptacle 12. Rim 38 also has a projection 42 on its outer surface to facilitate removal of the cover 14 from the receptacle 12.

To use the container 10 of the present invention, agitator-lens holder 16 is inserted in receptacle 12 with the agitator arm 30 extending upwardly, and the receptacle is filled up to line 26 with water or a cleaning solution. Agitator-lens holder 16 is then raised by grasping the top of agitator arm 30 and lifting upwardly until the lens holder plate 28 is near the top of receptacle 12. The contact lenses 44 and 46, shown in phantom, are placed on the top surface of lens holder plate 28, one lens on each side of agitator arm 30. The contact lens having the indicia mark thereon is placed on the portion of lens holder plate 28 having the indicia mark 34 thereon. Agitator-lens holder 16 is then lowered into receptacle 12 by pressing down on agitator arm 30 until the lens holder plate 28 rests on the raised portion 22 of bottom 18. Holes 32 in lens holder plate 28 permit the liquid in container 12 to pass therethrough so as to permit ease of movement of the lens holder plate 28 through the liquid. The raised portion 22 of bottom 18 holds the lens holder plate 28 away from bottom 18 to insure that the lenses 44 and 46 are entirely surrounded by the liquid. In addition, the raised portion 22 prevents a suction from occurring under the lens holder plate 28 when it is lifted away from bottom 18 so that the agitator-lens holder 16 can be raised easily. Cover 14 is then placed over the upper end of receptacle 12 and secured thereto by the lip 24 fitting in the groove 40.

To remove the lenses from the container 10, the cover 14 is removed from the receptacle 12 by lifting up on the projection 42 on the rim 38 of the cover 14. The agitator-lens holder 16 is then raised by lifting up on agitator arm 30 until the lens holder plate 28 is near the top of receptacle 12. The lenses 44 and 46 can then be removed from the lens holder plate 28 without the user getting his fingers wet from the liquid in the receptacle 12. Since the lens which has the indicia mark thereon is on the portion of lens holder plate 28 having the indicia mark 34 thereon, there is a clear indication to the user as to which lens is the right lens and which is the left lens.

Thus, there is provided a small-compact container for safely storing contact lenses in a fluid, and which permits the lenses to be easily inserted and removed without the user getting his fingers wet. Since the cover 14 fits tightly on the receptacle 12 if the container 10 is accidentally tipped over, the contact lenses will not be lost or damaged. By having a separate compartment for each contact lens, the lenses cannot hit against each other and thereby become damaged, and the lenses are easily identifiable.

To clean the contact lenses, the cover 14 is removed from the receptacle 12 and the lens holder plate 28 is moved up and down through the solution in the receptacle 12 by lifting up and pushing down on the agitator arm 30. This moves the contact lenses 44 and 46 through the solution in the receptacle 12 and agitates the solution around the contact lenses 44 and 46 to properly clean the lenses. Thus, the contact lenses may be quickly and easily cleaned each time they are used without the necessity of handling the lenses .

The present invention may be embodied in other specific forms without departing from the spirit or essential attributes thereof and, accordingly, reference should be made to the appended claims, rather than to the foregoing specification as indicating the scope of the invention.

I claim:

1. A container for contact lenses comprising a receptacle having a substantially flat bottom with a raised central portion and an upstanding wall, an agitator-holder slideably fitting in said receptacle, said agitator-holder comprising a flat plate extending substantially parallel to the bottom of said receptacle and normally resting on said raised central portion, said plate including means providing for passage of liquids from above said plate to below said plate, an arm secured to the upper surface of said plate and extending upwardly therefrom, and a cover fitting tightly across the top of the wall of said receptacle and removable therefrom, said arm extending across the plate for substantially the full width of the plate and dividing the upper surface of said plate into two parts, and said arm being of a length slightly shorter than the height of the wall of the receptacle.

2. A container in accordance with claim 1 in which the plate has a colored indicia mark on its upper surface to one side of said arm.

3. A container in accordance with claim 2 in which said means includes a plurality of holes in said plate with at least one hole being on each side of said arm.

4. A container for contact lenses comprising a receptacle of transparent plastic material having a substantially flat bottom and an upstanding wall, said upstanding wall being of a height considerably greater than the largest dimension of a contact lens, an agitator-holder of opaque plastic material slideably fitting in said receptacle, said agitator-holder comprising a flat plate extending substantially parallel to the bottom of said receptacle, and an arm secured to the upper surface of said plate and extending upwardly therefrom, said arm extending across said plate for substantially the full width of said plate and dividing the upper surface of said plate into two parts, a plastic cover removably fitting tightly across the top of the wall of said receptacle, the bottom of said container having a central raised portion on which said plate normally rests, and said plate including means providing for passage of liquids from above said plate to below said plate.

5. A container comprising a receptacle having a substantially flat bottom and an upstanding wall, an agitator-holder slideably fitting in said receptacle, said agitator-holder comprising a plate extending substantially parallel to the bottom of said receptacle and an arm secured to the upper surface of said plate and extending upwardly therefrom, said arm extending across said plate for substantially the full width of the plate and dividing the upper surface of said plate into two parts, a liquid partially filling said receptacle, a pair of contact lenses in said receptacle and seated on the upper surface of said agitator-holder plate, with one lens being on one side of said arm and the other lens being on the other side of said arm, the wall of said container being of a height considerably greater than the largest dimension of said contact lenses, and a cover removably fitting across the top of the wall of said receptacle.

6. A container in accordance with claim 5 in which the plate has a colored indicia mark on its upper surface to one side of said arm, and the lens on said one side of the arm has an indicia mark thereon.

7. A container in accordance with claim 6 in which the plate has a plurality of holes therethrough, with at least one hole being on each side of the arm.

References Cited in the file of this patent

UNITED STATES PATENTS

| 829,036 | Ryan | Aug. 21, 1906 |
| 1,342,243 | Wilson | June 1, 1920 |
| 1,466,132 | Lippert | Aug. 28, 1923 |
| 2,269,026 | Klinghoffer | Jan. 6, 1942 |
| 2,617,519 | O'Sullivan | Nov. 11, 1952 |
| 2,714,443 | Kuvin | Aug. 2, 1955 |
| 2,877,779 | Bromberg | Mar. 17, 1959 |

FOREIGN PATENTS

| 957,083 | France | Aug. 22, 1949 |